May 30, 1967 J. J. LARKINS 3,323,122
PROTECTIVE ALARM DEVICE
Filed June 24, 1965
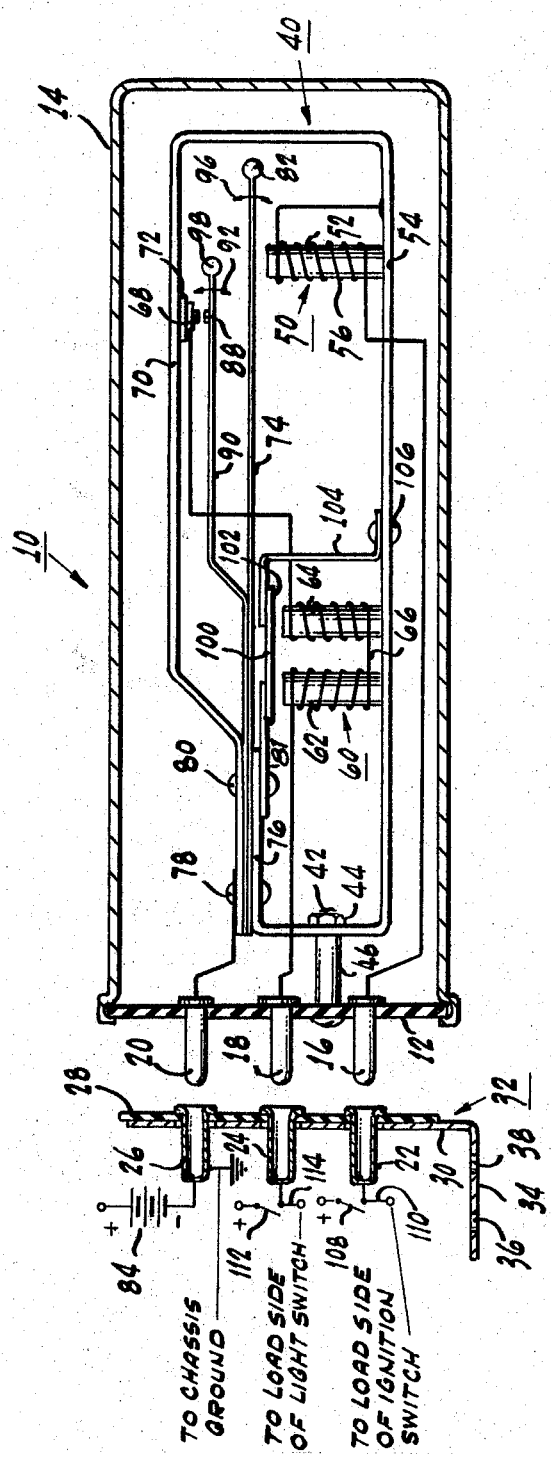
INVENTOR
JOSEPH J. LARKINS 3,323,122
PROTECTIVE ALARM DEVICE
Joseph J. Larkins, 325 Delaware Ave.,
Riverside, N.J. 08075
Filed June 24, 1965, Ser. No. 466,766
6 Claims. (Cl. 340—384)

This invention relates generally to signal devices, and more particularly to a signal device adapted to provide a signal or an alarm when a certain condition exists between two electrically interrelated circuits. While not specifically nor exclusively limited thereto, the signal device of the present invention is particularly useful for warning a motorist that his lights are still on when his automobile ignition switch is turned off.

When two or more independently switched electrical circuits, in a complex machine, such as an automobile, are operated from a single source of energy, such as a battery, it is usually desirable to switch all of the circuits off when the machine is not in operation to conserve the energy of the battery. It is not always feasible to control all of the circuits in the machine through a single master switch because it is sometimes necessary to operate each circuit independently. It is, however, desirable to provide a signal to indicate that one circuit, such as an automobile headlight circuit, is energized when a related circuit, such as the automobile ignition circuit, is de-energized because it is usually desirable, although not always so, to de-energize both of these circuits at the same time.

A motorist may often forget to switch off his headlights under certain conditions, such as after emerging from a tunnel during the day, parking his car in a well-lighted area in the evening, or after emerging from a fog in which his lights were used as a safety measure, for example. In accordance with the present invention, the signal device provides the motorist with a warning, indicating that his lights are on so that he may turn them off if ambient conditions so warrant.

It has been proposed to provide signal or alarm devices to remind a motorist that his lights are on when his ignition switch is turned off, but such prior art devices provide a continous signal until they are switched off manually. While such devices may be satisfactory under certain conditions, they offer no protection if the signal is an audible one and the automobile is parked in an area where the ambient noise is high, so that the signal will not be heard and the battery will be run down by the signal device. Also, such devices may not provide a sufficiently adequate alarm if the automobile battery is in a weakened condition, in which case the alarm would weaken the battery still further if not turned off.

It is an object of the present invention to provide an improved signal device to furnish a signal or an alarm when only one of two electrical interrelated, but independently switched circuits is turned off.

Another object of the present invention is to provide an improved signal device of the type described that will overcome the aforementioned disadvantages of prior art alarm devices.

Still another object of the present invention is to provide an improved signal device that will furnish a signal or an alarm for only a predetermined relatively short period of time when a certain condition exists between two electrically interrelated circuits.

A further object of the present invention is to provide a signal device of the type described that is relatively easy and inexpensive to manufacture, simple in operation, and yet highly efficient in use.

These and other objects of the present invention are achieved in an improved signal device for providing a signal of a relatively short predetermined duration when one of two electrically interconnected, and previously energized, electrical circuits is de-energized. The signal device will be described hereinafter in connection with the ignition and tail-light circuits of an automobile, but it is understood that its use is not limited to automobiles and may be employed for rendering a signal under analagous conditions between any two similarly related circuits. (The tail-light circuit in most automobiles is usually energized when either the parking light circuit, the fog light circuit, or the headlight circuit is energized.) The signal device comprises a metallic frame which can function as a common electrical connection for the interrelated ignition and tail-light circuits. A first electro-magnet is mounted on the frame and means are provided to energize the first electro-magnet when the ignition circuit is energized. A second electro-magnet is also mounted on the frame and means are provided to connect the tail-light circuit electrically with the second electro-magnet and a pair of normally open points. One of the points is insulated from the frame and the other of the points is on a first flexible armature associated with the first electro-magnet. The first armature is attracted to the first electro-magnet and is adapted to oscillate for a relatively short period of time when the first electro-magnet is de-energized, as when the ignition switch is opened. During the time of this oscillation, the points contact each other periodically and the second electro-magnet is energized, if the tail-lights are on, causing a second armature associated therewith to provide a signal at the frequency of oscillation of the first armature associated with the first electro-magnet. The signal lasts until the oscillations of the first armature is damped sufficiently so that the points can no longer contact each other, usually a matter of a few seconds.

The novel features of the present invention, as well as the invention itself, both as to its organization and method of operation, will be understood in detail from the following description, when considered in connection with the drawing, the single figure of which is a sectional view of a signal device connected in a schematic diagram of a portion of an automobile electrical system, in accordance with the present invention.

Referring to the drawing, there is shown a signal device 10 of the type suitable for installation in an automobile to provide a signal to the motorist if he turns off the ignition switch and the tail-lights remain energized. The signal device 10 comprises a base sheet 12 of insulating material of any suitable configuration, such as round, rectangular, or square, for example, to which is crimped the rim of a container 14, preferably of a metal, such as aluminum. A plurality of pins 16, 18 and 20 are fixed to, and extend from, the sheet 12 and are adapted to engage within a plurality of mating sockets 22, 24 and 26, respectively, for electrical connections therewith.

The sockets 22, 24 and 26 are fixed to a sheet 28 of insulating material, and the sheet 28 is fixed to one wall 30 of a bracket 32 by any suitable means, such as glue. The sockets 22, 24 and 26 extend through enlarged aligned holes in the wall 30 and are insulated from the wall 30 by the sheet 28. A wall 34 of the bracket 32 is formed with a pair of holes 36 and 38 for mounting the bracket 32 in a suitable location in an automobile, as beneath the dashboard of the automobile, and the signal device 10 is adapted to be plugged into the sockets 22, 24 and 26 by means of its mating pins 16, 18 and 20, respectively.

A metal frame 40 in the form of a somewhat distorted rectangle is fixed to the sheet 12 by any suitable means, such as by means of a screw 42, a nut 44, and a tubular spacer 46. The screw 44 extends through the sheet 12 through a suitable opening therein, and the frame 40 is spaced from the sheet 12 by the tubular spacer 46, the latter being disposed on the shank of the screw 42.

An electro-magnet 50 has one end of a soft iron core 52 fixed to a wall 54 of the frame 40. A coil 56 of the electro-magnet 50 has one end thereof electrically connected to the wall 54, by any suitable means, and the other end electrically connected to the pin 16. The frame 40 may serve as a common electrical connection for the purpose hereinafter appearing.

Another electro-magnet 60, having two soft iron cores 62 and 64, is also fixed to the wall 54, the ends of the cores 62 and 64 being fixed thereto by any suitable means, as by welding, for example. A continuous coil 66 of the electro-magnet 60 has one end electrically connected to the pin 18 and its other end connected to an electrical contact 68. The electrical contact 68 is insulated from a wall 70 of the frame 40 by a strip of insulation 72.

An elongated flexible armature 74 has one end fixed to a wall 76 of the frame 40 by any suitable means, such as by rivets 78 and 80. The other end of the armature 74 is disposed adjacent to the free end of the core 52 and is adapted to be attracted by the core 52 when the electro-magnet 50 is energized. A weight 82 may be disposed on the free movable end of the armature 74 to enable the armature 74 to oscillate for a predetermined length of time, say two or three seconds, for example, when the electro-magnet 50 is de-energized.

The frame 40 is adapted to be connected to a common connection, such as the chassis of an automobile. To this end, an electrical connection is made between the rivet 78 and the pin 20. The socket 26, with which the pin 20 mates, is connected to the chassis (ground) and to the negative terminal of a source of voltage such as a battery 84.

Means are provided to ground the contact point 68 periodically by means of the oscillatory motion of the armature 74 when the electro-magnet 50 is de-energized. To this end, a contact point 88 is disposed opposite to the contact point 68 and in a normally spaced-apart relationship therewith. The contact point 88 is disposed on a flexible arm 90, one end of which is fixed to the upper wall 70 by the rivets 78 and 80 and the other end of which is free to oscillate in the direction of the double headed arrows 92 when the armature 74 is caused to oscillate. The arm 90 is considered to be a part of the armature 74 and may be connected directly to it. A portion of the arm 90 adjacent to its fixed end is in substantial contact with a portion of the armature 74 adjacent to the latter's fixed end. Hence, when the armature 74 is caused to oscillate in the direction of the double headed arrows 96, the arm 90 is also caused to oscillate in the direction of the arrows 92, whereby the contact 88 physically engages the contact 68 intermittently for a duration varying from a fraction of a second to a few seconds to complete the electrical circuit including the coil 66 of the electro-magnet 60. The pair of contact points 68 and 88 are normally open when the electro-magnet 50 is de-energized. A weight 98 of appropriate size and weight may be disposed at the free end of the flexible arm 90 to control the amplitude of oscillation.

An armature 100 is disposed opposite to the free ends of the cores 62 and 64 of the electro-magnet 60 and is adapted to be attracted to the cores 62 and 64 when the electro-magnet 60 is energized. One end of the armature 100 is fixed to the wall 76 of the frame 40 by means of the rivet 80 and a sheet spring 81. The free end 102 of the armature 100 is spaced from the free end of the core 64 and limited in its motion away from the free end of the core 64 by means of one end of an inverted L-shaped bracket 104. The other end of the bracket 104, remote from the free end 102 of the armature 100, is fixed to the wall 54 of the frame 40 by means of a rivet 106. Thus, it will be understood that the armature 100 will cause a buzzing noise when the electro-magnet 60 is energized intermittently because the free end 102 of the armature 100 will intermittently engage the free end of the bracket 104 physically, thereby providing an audible signal or alarm. The free end of the bracket 104 may also have bell means (not shown) fixed thereto, as in a house bell, if a bell sound is desired.

The socket 22 is electrically connected to the load side of an ignition switch 108, of the type used in automobiles, when the latter is connected to a positive source of voltage, as to the positive terminal of the battery 84, by any suitable means (not shown) known in the art. Thus, when the ignition switch 108 is closed, the ignition circuit (not shown) is energized from the voltage source 84 through lead 110, and the electro-magnet 50 is energized if the pins 16, 18 and 20 are in engagement with the sockets 22, 24 and 26, respectively.

The load side of a light switch 112 may be connected to the tail-lights of an automobile through a conductor 114. The conductor 114 is also connected to the socket 24. The armature of the light switch 112 is connected to the positive source of voltage 84 by any suitable means (not shown) known in the art. The socket 26 is connected to the negative terminal of the source of voltage 84 and also to the chassis of the automobile so that the frame 40 is grounded when the pin 20 is in electrical engagement with the socket 26.

The operation of the signal device 10 in accordance with the present invention will now be described. The pins 16, 18 and 20 of the signal device 10 are plugged into the sockets 22, 24 and 26, respectively.

*Example I.—Operating an automobile with its lights on*

The ignition switch 108 is closed to energize the ignition circuit and to start the automobile. When the ignition switch 108 is closed, the electro-magnet 50 is energized by current flowing through the coil 56, magnetizing the core 52. The armature 74 is attracted to the free end of a core 52 and held there until the ignition switch 108 is opened. The lights of the automobile are energized by closing the light switch 112. When the light switch 112 is closed, the side of the coil 66 that is connected to the pin 18 is connected to the positive side of the battery, but no current flows through the coil 66 until the contact point 68 is grounded, as when the arm 90 is caused to oscillate, whereby the contact point 88 will engage the contact point 68 intermittently and connect the latter to ground intermittently.

When it is desired to stop the automobile, the ignition switch 108 is opened. Opening the ignition switch 108 de-energizes the electro-magnet 50 and releases the armature 74, whereby the latter, because of its resiliency and weight 82, oscillates through an arc indicated by the double-headed arrows 96. The latter oscillation also causes the arm 90, because of the physical engagement of the armature 74 with the arm 90, to oscillate. This oscillatory motion also causes the movable contact 88 to intermittently engage the fixed contact 68. Under these conditions, current flows intermittently through the coil 66, energizing the electro-magnet 60 intermittently and attracting the armature 100 intermittently. The latter intermittent attraction of the armature 100 causes its free end 102 to make a noise, or buzz, against the free end of the bracket 104. Depending upon the resiliency of the armature 74 and arm 90, and the size of the weights 82 and 98, the oscillatory motion of the armature 74 and the arm 90 may continue for a duration of time ranging from a fraction of a second to about five seconds, for example, thereby providing an audible signal for substantially this period to notify the motorist that his lights are on and should be turned off if so desired. The contacts 68 and 88 are normally open when the oscillatory motion is completely damped.

*Example II.—Operating an automobile with its lights off*

When an automobile is operated with its lights off, the armature 74 will be attracted to the free end of the core 52 of the electro-magnet 50 if the ignition switch 108 is closed. If the light are off when it is desired to turn the ignition switch 108 off, the electro-magnet 60 will not be energized by the oscillatory motion of the armature 74 and arm 90 because the light switch 112 is open. Hence, no signal will be provided under these conditions.

*Example III.—Energizing lights in an automobile when the ignition switch is open*

If it is desired to energize the lights of an automobile without starting the engine of the automobile, that is without closing the ignition switch 108, the light switch 112 is closed. Under these conditions, both the electro-magnets 50 and 60 are de-energized. When the light switch 112 is opened, no oscillatory motion of the armature 74 and arm 90 results, and therefore, no signal or alarm is caused.

Although the electro-magnet 50 is illustrated with only one coil 56, it is understood that the electro-magnet 50 may contain another coil, similar to the coil 56, for connection between ground and the accessory portion of the ignition switch of the automobile to indicate, for example, that a light circuit is energized when the accessory portion of the ignition switch is turned off, as when the automobile radio is turned off by the accessory portion of the ignition switch.

Thus, there has been shown and described a signal device of the type which provides a signal when one of two interconnected circuits is de-energized and the other circuit is energized. The signal or alarm lasts for a relatively short time, a matter of seconds, and turns itself off automatically at the end of the signal period determined by a damped oscillation of a vibrating armature. While the signal device of the present invention has been described and illustrated in connection with an ignition circuit and a light circuit of an automobile, it is understood that it may be used to indicate analagous operations between other circuits. Thus, various modifications may be made in the present invention without departing from the spirit and scope thereof. It is, therefore, desired that only such limitations shall be placed upon the invention as are necessitated by the prior art and set forth in the appended claims.

What is claimed is:

1. A signal device for providing a signal when one of two previously energized circuits is de-energized, said device comprising:
   first and second electro-magnets having first and second armatures, respectively, spaced from their respective electro-magnets,
   means connecting said first electro-magnet to said one circuit to be energized when said one circuit is energized, whereby to attract said first armature, said first armature being flexible,
   a pair of normally open contact points cooperatively associated with said first armature and adapted to be closed intermittently when said first armature is released by said first electro-magnet and caused to oscillate,
   means including said first armature and said pair of contact points to connect said second electromagnet to the other of said two circuits intermittently to energize said second elecro-magnet intermittently when said first electro-magnet is de-energized and said first armature is released and caused to oscillate until it is damped, said second electro-magnet being energized for a portion of the time said first armature oscillates and said contact points are closed intermittently, and
   means adjacent said second armature for engagement therewith for providing said signal.

2. In a system comprising at least two electrical circuits, signal means to provide a signal when one of said two circuits is de-energized after both of said circuits had been energized, said signal device comprising:
   a first electro-magnet comprising a first coil and a first flexible armature,
   means connecting said first coil to said one circuit to activate said first armature when said one circuit is energized,
   a second electro-magnet comprising a second coil and a second armature,
   a pair of normally open contact points,
   means connecting one of said contact points in series with said second coil and to the other of said circuits,
   means connecting the other of said contact points to said first armature, said first armature also being connected to said other circuit and adapted to energize said other circuit when said contact points are in engagement with each other, said first armature and said last mentioned means being adapted to oscillate and to come to rest after a short period of time when said first armature is released from said first electromagnet after said one circuit is de-energized, said other of said contact points being adapted to engage said one contact point intermittently during a portion of said oscillations before said first armature comes to rest, whereby to energize said second coil intermittently and to activate said second armature, and
   means cooperatively engaged by said second armature to provide said signal to indicate that said one circuit has been de-energized and said other circuit is energized.

3. In an electrical system comprising at least first and second circuits, each having a common connection, signal means to provide a signal when said first circuit is de-energized, after said first and said second circuits had been previously energized, said signal device comprising:
   a first electro-magnet comprising a first coil and a first armature,
   means connecting said first coil to said first circuit and to said common connection to activate said first armature when said first circuit is energized,
   a second electro-magnet comprising a second coil and a second armature,
   a pair of contact points,
   means connecting one of said contact points in series with said second coil and to said second circuit,
   means connecting said first armature to said common connection, said other of said contact points being connected to said first armature, said first armature being adapted to oscillate and to come to rest after a short period of time when released by said first electro-magnet after said first circuit is de-energized, said other contact point being disposed to engage said one contact point intermittently and to complete the circuit through said second coil during a portion of said oscillations before said first armature comes to rest, whereby to activate said second armature intermittently and
   means adjacent to said second armature to provide said signal when said second armature is activated.

4. A signal device to indicate a first circuit is energized when a second circuit is de-energized after both circuits had been energized, said signal device comprising:
   a first electro-magnet having a first armature,
   means connecting said first electro-magnet to said second circuit to attract said first armature when said second circuit is energized,
   a second electro-magnet comprising a second armature,
   means to connect said second electro-magnet to said first circuit,
   a pair of normally open contacts, one of said contacts being fixed and connected to said second electromagnet,
   means connecting the other of said contacts to said first armature for movement therewith, said other contact being connected to complete the circuit for current through said second electro-magnet when said other contact is in electrical engagement with said one contact, said first armature being adapted to oscillate until damped naturally, when said second circuit is de-energized, whereby said other contact touches said one contact intermittently and energizes said second electro-magnet intermittently, and means cooperatively engaged with said second armature to provide a signal when said second electro-magnet is energized.

5. A signal device for a vehicle to indicate its light circuit is energized when its ignition circuit is de-energized, said signal device comprising:

a first electro-magnet having a first core, a first coil, and a first armature, means connecting said first coil to said ignition circuit to attract said first armature to said first core when said ignition circuit is energized, a second electro-magnet comprising a second core, a second coil, and a second armature, means connecting said second coil to said light circuit, a pair of normally open contacts, one of said contacts being fixed and electrically connected to said second coil, means connecting the other of said contacts to said first armature for movement therewith, said other contact being connected to complete the circuit through said second coil when said other contact is in electrical engagement with said one contact, said first armature being adapted to oscillate when said ignition circuit is de-energized and to cause said other contact to touch said one contact intermittently and to energize said second electro-magnet intermittently, and means adjacent to said second armature to provide a signal when said second electro-magnet is energized.

6. A signal device for providing a signal when one of two previously energized electrical circuits is de-energized, said device comprising:

a frame, said frame being a common connection for said circuits, first and second electro-magnets mounted on said frame, means connecting the coil of said first electro-magnet to said one circuit to energize said one electro-magnet when said one circuit is energized, a pair of normally open contacts, one of said contacts being insulated from said frame, and fixed thereto, a first flexible armature having one end fixed to said frame and the other end disposed to be attracted by said first electro-magnet when the latter is energized, said first armature being adapted to oscillate for a predetermined time until damped naturally when said one circuit is de-energized, means fixing the other of said contacts to said first flexible armature adjacent to said other end thereof, means connecting the coil of said second electro-magnet to said other of two circuits and to said one contact, said other contact being disposed to engage said one contact periodically, during a portion of said predetermined time, when said first armature oscillates periodically during said predetermined time, whereby to energize said second electro-magnet periodically during said portion of said predetermined time, said second armature having one end adjacent to said second electro-magnet and the other end fixed to said frame, said second armature being disposed to be attracted by said second electro-magnet when the latter is energized, and means adapted to engage said second armature when the lattter oscillates, whereby to provide said signal.

References Cited
UNITED STATES PATENTS

| | | | |
|---|---|---|---|
| 2,742,630 | 4/1956 | Muncheryan | 340—52 |
| 2,780,797 | 2/1957 | Gooding | 340—52 |
| 2,799,843 | 7/1957 | Savino | 340—52 |
| 3,124,782 | 3/1964 | Norton | 340—81 X |

NEIL C. READ, *Primary Examiner.*

I. J. LEVIN, *Assistant Examiner.*